(12) United States Patent
Emery et al.

(10) Patent No.: US 9,578,258 B2
(45) Date of Patent: Feb. 21, 2017

(54) METHOD AND APPARATUS FOR DYNAMIC PRESENTATION OF COMPOSITE MEDIA

(71) Applicant: V-Poll, Venice, CA (US)

(72) Inventors: Stephen John Emery, Los Angeles, CA (US); Andrew Jay Sachs, Los Angeles, CA (US); Joseph Sumner, Venice, CA (US); David King Lassman, Los Angeles, CA (US)

(73) Assignee: V-POLL, INC., Venice, CA (US)

( * ) Notice: Subject to any disclaimer, the term of this patent is extended or adjusted under 35 U.S.C. 154(b) by 41 days.

(21) Appl. No.: 14/297,371

(22) Filed: Jun. 5, 2014

(65) Prior Publication Data

US 2014/0362297 A1 Dec. 11, 2014

Related U.S. Application Data

(60) Provisional application No. 61/831,546, filed on Jun. 5, 2013.

(51) Int. Cl.
| | |
|---|---|
| *H04N 9/74* | (2006.01) |
| *H04N 5/265* | (2006.01) |
| *H04N 5/77* | (2006.01) |
| *H04N 9/82* | (2006.01) |

(52) U.S. Cl.
CPC .............. *H04N 5/265* (2013.01); *H04N 5/772* (2013.01); *H04N 9/8205* (2013.01)

(58) Field of Classification Search
CPC . G06F 21/6218; G06F 17/30864; G06Q 50/01

USPC ........ 707/748, 752, 754, 784, 785; 705/319; 348/584

See application file for complete search history.

(56) References Cited

U.S. PATENT DOCUMENTS

| | | |
|---|---|---|
| 2005/0050047 A1 | 3/2005 | Laronne |
| 2009/0132519 A1 | 5/2009 | Rathod et al. |
| 2010/0042648 A1* | 2/2010 | Cannon .................. G06Q 10/10 707/785 |
| 2010/0121857 A1 | 5/2010 | Elmore et al. |
| 2012/0317210 A1 | 12/2012 | Fisher et al. |
| 2013/0013683 A1 | 1/2013 | Elliott |

OTHER PUBLICATIONS

International Search Report and Written Opinion dated Dec. 10, 2014 regarding PCT/US2014/041162.

* cited by examiner

*Primary Examiner* — Thai Tran
*Assistant Examiner* — Mishawn Hunter
(74) *Attorney, Agent, or Firm* — Arent Fox LLP (57) ABSTRACT

The system provides a method and apparatus for constructing, and for dynamically rearranging the order of content in a composite video. The re-ordering of clips in the composite video can be based on one or more weighting factors associated with each clip. These factors can include freshness or newness of the clip, popularity based on the number of "likes" of a clip by others, the content of the clip (e.g. celebrity creator or presence), paid boosting (e.g. for commercial concerns); and other factors. Each clip has associated metadata that can be used to assign a weight value to the clip for purposes of reordering the composite video.

4 Claims, 9 Drawing Sheets

METHOD AND APPARATUS FOR DYNAMIC PRESENTATION OF COMPOSITE MEDIA

This patent application claims priority to provisional patent application 61/831,546 filed on Jun. 5, 2013 which is incorporated by reference herein in its entirety.

BACKGROUND OF THE SYSTEM

The ability to create video has become widespread due to the presence of cameras in many common devices (computers, cell phones, smart phones, tablet computers, lap tops, PDA's and the like). Users often want to combine their own video clips, and/or the clips of others, into composite videos. However, to date there has not been a convenient method of easily combining and rearranging video content from multiple sources into a composite video.

SUMMARY

The system provides a method and apparatus for constructing, and for dynamically rearranging, the order of content in a composite video. The re-ordering of clips in the composite video can be based on one or more weighting factors associated with each clip. These factors can include freshness or newness of the clip, popularity based on the number of "likes" of a clip by others, the content of the clip (e.g. celebrity creator or presence), paid boosting (e.g. for commercial concerns); and other factors. Each clip has associated metadata that can be used to assign a weight value to the clip for purposes of reordering the composite video.

In one embodiment, a stimulus is provided with a call to action. The call to action is to video a response to the stimulus and to upload the response to a location that can combine a plurality of responses into a composite video. At some point, the composite video is made available for viewing by others. At that point, each viewer may submit their own response to the stimulus, or to some clip in the composite video. This new response is then added to the composite video. The order of presentation of the clips is dynamic so that the new clip can be placed anywhere within the composite video. In one embodiment, there will be desirable locations in the composite video (e.g. "first", next to a celebrity clip, next to a highly liked clip, and the like). A new responder will have their clip inserted into this desirable spot. When that new responder shares that composite video, their location is preserved. Each recipient can add their own new response and be given the preferred location, moving everyone over in order. There may be a plurality of versions of the composite video, each one tailored to favor the clip of the responder.

In another embodiment, shared composites may include the friends of the user in favored positions. In another embodiment, when a composite is shared with a recipient, the system will determine if there are clips from friends of the recipient and arrange the composite to favor the friends of the recipient.

DETAILED DESCRIPTION OF THE SYSTEM

The system will be described in connection with an example where users respond to a stimulus to create a composite video. The system is not limited to this embodiment, and other embodiments may be implemented without departing from the scope and spirit of the system. For example, the system could be audio only if desired. The example begins with a stimulus to which there are one or more responses. The responses are strung together automatically into a composite video. The composite video can be reordered and modified based on weighting factors.

Stimulus

In one embodiment, the system contemplates the presentation of a stimulus to encourage a response. The stimulus may be, for example, a short video clip asking a question. The system contemplates a number of different categories of stimuli. For example, there may be a commercial stimulus. This is a call to action for a product or service and the stimulus is sponsored by a manufacturer or advertiser. The sponsor is hoping to get a plurality of responses about the product and to use those responses as part of a marketing campaign. Consider the type of ad where customers are shown leaving a movie or show and each customer has some comment about the show. Such ads are done manually at great expense. Using this system, such ads can be created automatically.

Another stimulus category is a celebrity driven stimulus. A celebrity could be filmed asking dozens of questions. Each question can then be released as a separate stimulus to prompt a response.

Another stimulus category is a user generated stimulus. The system contemplates allowing any user to generate their own stimulus and to make it available to others for response.

Figure 1:
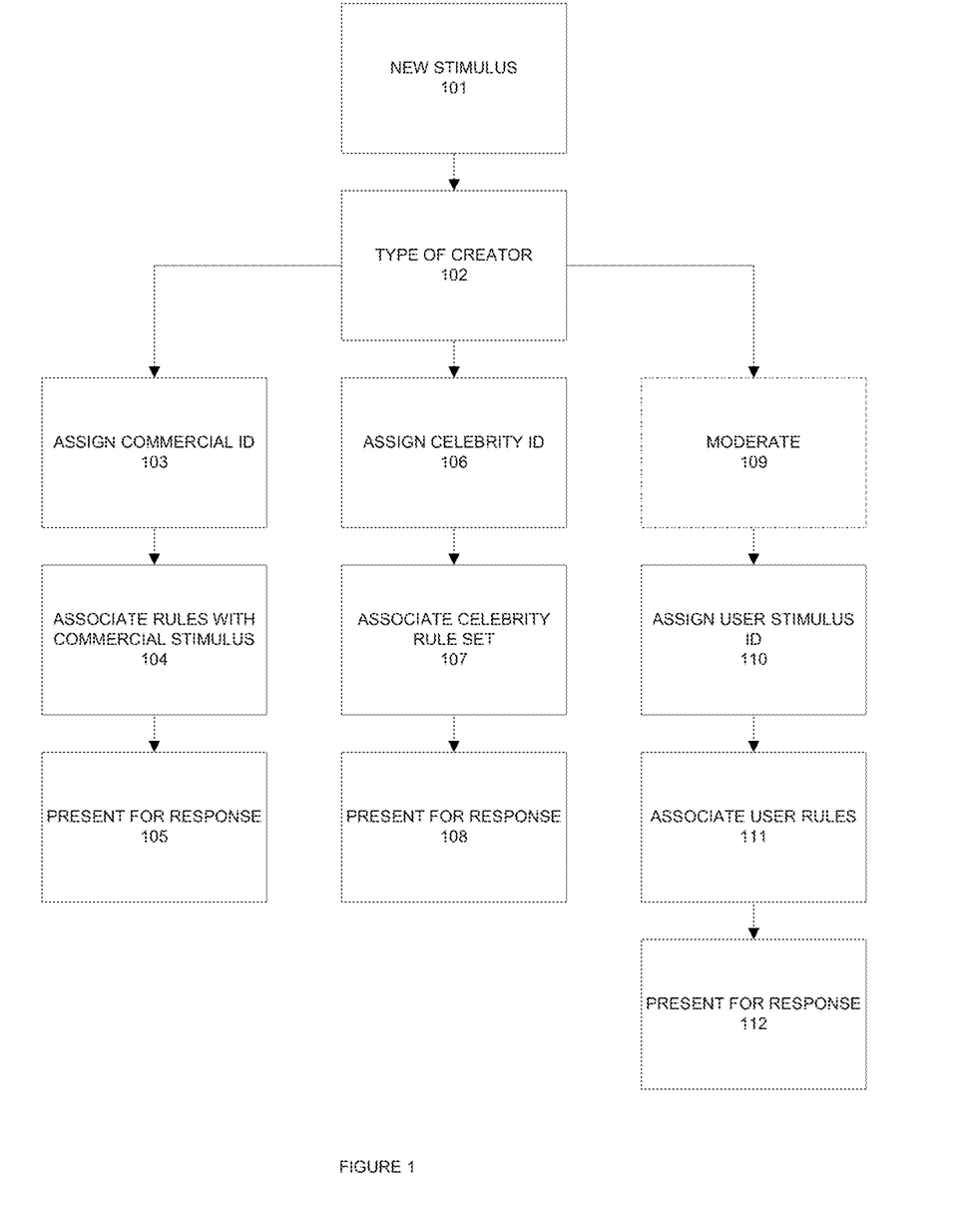
FIG. 1 is a flow diagram illustrating the creation of a stimulus in an embodiment of the system.

FIG. 1 is a flow diagram illustrating the generation of a stimulus in one embodiment of the system. At step 101 a new stimulus is provided. At step 102 the type of creator of the stimulus is defined. Depending on the type of creator, different actions are taken. If it is a commercial creator, the system proceeds to step 102 and assigns the stimulus a commercial ID. Each stimulus has a unique identifier ID that is part of the metadata that will always be associated with the stimulus. This allows all responses to the stimulus to be easily grouped and associated with the stimulus. It also allows for easy tracking of the stimulus and further handling of the stimulus.

At step 104 the system associates any rules that may be required for the commercial stimulus. For a commercial stimulus, the sponsor may have certain weighting factors that will be used to both dynamically order the composite video and to filter out certain comments. In one embodiment the system uses speech recognition in conjunction with a dictionary of terms to classify responses as positive or negative. In other instances, the system can generate a histogram of responses so the sponsor can identify the words or phrases most commonly used in response to the stimulus. Another rule that can be applied to a stimulus and response is the length of the response. In some cases the length is unlimited. In other cases the response is limited to some fixed length, e.g. five seconds.

Another rule that might apply to this or other types of creators is a facial recognition algorithm to ensure that a person is actually making the response. This also adds a layer of accountability to the system so that a responder may be more honest or cautious in responding. This feature is also used to minimize the possibility of rude, sexual, or other unwelcome images as part of the composite video. If the system does not recognize a face in the camera, the response will not be included in the composite video. This rule can be applied regardless of the type of creator and be implemented for all creation of stimuli and/or all responses.

After the rules have been associated with the commercial stimulus, the system presents the stimulus for response at step 105. This may be performed in a plurality of ways, such as posting on a web site, pushing to subscribers, sending an alert to system members, posting on social media, and the like.

If the creator is a celebrity, the system proceeds to step 106 and assigns the stimulus a unique celebrity category ID. At step 107 the system associates one or more celebrity rule sets with the stimulus. These rule sets may include the same general rules that may apply to the system as a whole, as well as rule sets that are specific to celebrities in general or to any particular celebrity. For example, a participating celebrity may have exclusive promotional arrangements with one or more particular brands. In that case, the system will use its speech recognition software to filter out any responses that mention competitors of those brands, to avoid having it appear that a celebrity is endorsing another brand. In some cases, the rules associated with a celebrity stimulus (or response) may impact the methodology used for weighting, ranking, and positioning a stimulus or response. The system will tend to more highly rank a celebrity clip than a non-celebrity clip. In fact, in some cases, the clip may be permanently assigned a spot in the composite video as desired. At step 108 the celebrity stimulus is presented for response.

A user generated stimulus may be optionally moderated at step 109 to determine if there is any content or visual that would be considered offensive or not within the rules of the system. If the user stimulus is not appropriate, it will be discarded. If it passes optional step 109, then a unique stimulus ID is assigned at step 110, user rules are associated at step 111, and the stimulus is presented for response at step 112. In one embodiment, there is no initial moderation of a user stimulus. Subsequent moderating could take place if there are complaints about the stimulus.

In other embodiments, the stimulus could be separate from the composite video in that it may be a request for response in printed material, a request from a speaker (live, recorded, broadcast, etc.). The stimulus should have some way of identifying the stimulus so that response can be accurately associated with the stimulus. This may be by referencing a URL address or a keyword that is to be used in responding, a hash-tag, or the like.

In other instances, the system can operate as a second screen experience. During the broadcast of a program, the viewers may be provided with a specific stimulus during the broadcast or be invited simply to respond to the broadcast at a common location so that response can be associated appropriately.

Categories

Figure 5:
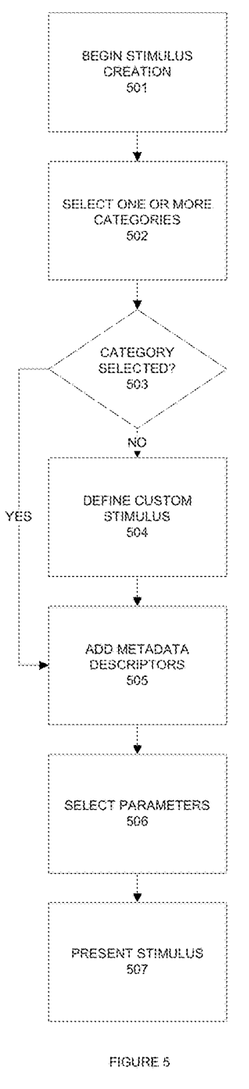
FIG. 5 is a flow diagram illustrating stimulus creation in one embodiment of the system.
Figure 6:
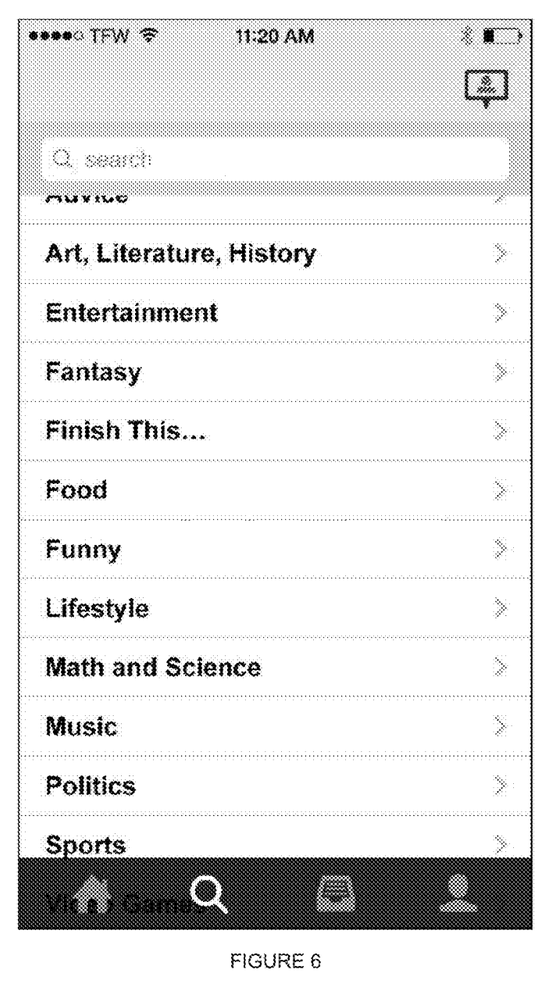
FIG. 6 is an example presentation of categories that can be associated with a stimulus.

In one embodiment, the creator of the stimulus is encouraged to select one or more categories that the creator believes are appropriate for the stimulus. FIG. 5 is a flow diagram illustrating stimulus creation in one embodiment of the system. At step 501 a creator invokes the stimulus creation operation of the system. At step 502 the creator is presented with a list of possible categories that can be selected to be associated with the stimulus. The creator may select one or more of the pre-existing categories to be associated with the stimulus. In one embodiment, the system presents the categories in nested and/or hierarchical lists as shown in FIG. 6. The creator may select a high level category such as Sports. The creator may then select a sub-level category such as baseball, football, basketball and the like.

Decision block 503 determines if the creator has selected at least one of the pre-existing categories. If not, the system proceeds to step 504 so the creator can define a custom category. This is accomplished at step 505 by adding metadata descriptors to be associated with the stimulus. These descriptors may be hash-tags, keywords, or some other suitable manner of associating metadata with a stimulus so that it can be searched in the future. The associated metadata will always include the ID of the creator as well as the type of creator (e.g. commercial celebrity, and the like). If enough users add the same hash-tag or descriptor, the system may add that as a predefined category.

Even if the creator has selected one or more categories at decision block 503, the system permits the creator to add additional metadata descriptors at step 505. At step 506 the creator is allowed to select parameters that may be associated with the stimulus. These parameters can include limitations on the number of clips that can comprise the composite video, a limitation on the amount of time of each response to the stimulus (e.g. 5 seconds), whether the composite will be ordered based on some creator or system defined rules, or whether the composite will be unordered.

At step 507 the stimulus is presented for response. In one embodiment this may be by simply posting it to the system and allowing others to discover it, or by sending it to specific users for response. In some embodiments, a user may follow one or more other users and be notified whenever an action, such as stimulus creation, takes place. In addition, the system may prompt the creator (or a responder to a stimulus) to share the stimulus and/or composite video with others through any of a plurality of mechanisms, including via text messaging, email, twitter, social media, and the like.

Response

When a stimulus is presented, it is then possible to provide a response to the stimulus. Typically, the response will be made on the same device on which the user is viewing the stimulus. The system may have its own app where a user can browse for a stimulus, have a stimulus pushed to them by the system, receive an alert or link from a friend, or through some other means. A user can respond to a stimulus by itself, or can respond to a composite video that has been created in response to the stimulus, or, in some cases, can respond to a particular response within the stream of responses in the composite video. In one embodiment, the responder does not need to have downloaded an app to respond to a stimulus or composite video. The system allows responses to be made freely. However, to initiate a stimulus or to take advantage of other features, the app may be required.

Figure 2:
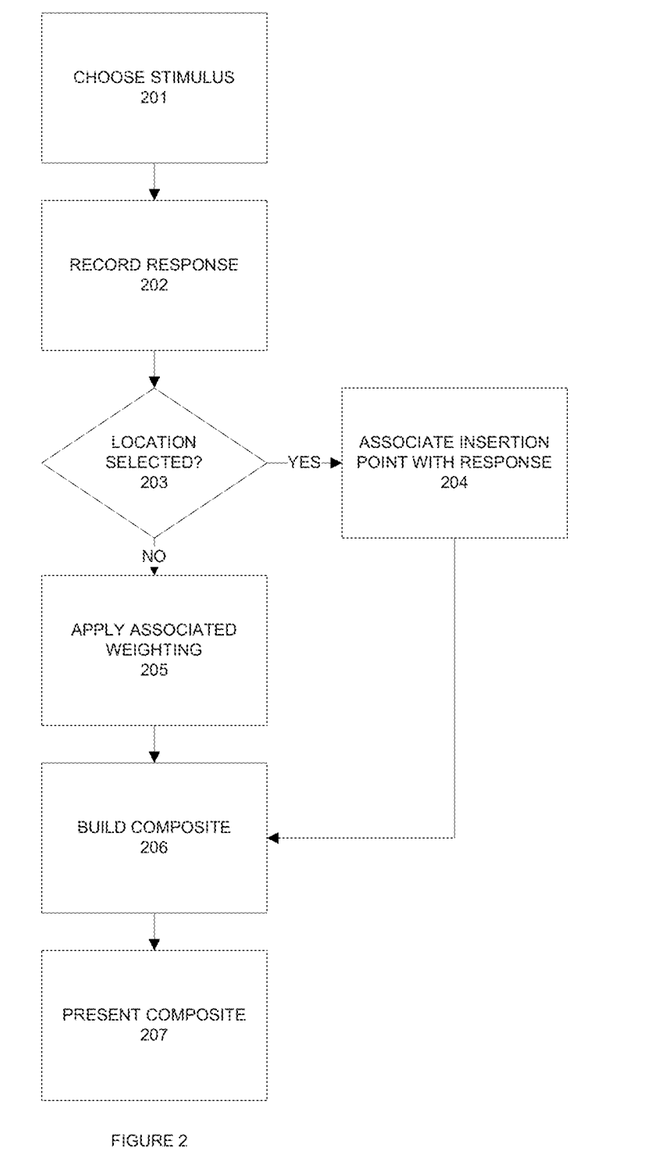
FIG. 2 is a flow diagram illustrating the creation of a response in an embodiment of the system.

A flow diagram illustrating an embodiment of the operation of the system in generating a response is illustrated in FIG. 2. At step 201 the responder chooses a stimulus to which to respond. As noted above, the stimulus may be pushed to the user, it may be selected by the user from a plurality of available stimuli, it may be a user initiated stimulus, or it may be a composite video of a stimulus and one or more responses to which the user is responding.

At step 202 the user records a response to the stimulus. In one embodiment, the presentation of the stimulus includes an icon or some other way of invoking a response environment. This aids the system in making sure that the response is associated with the correct stimulus.

At step 203 it is determined if the user has selected, indicated, or specified a location at which to place the user response. For example, if the user is responding to a composite video, the user may have paused at a certain location in the video and invoked the response action. In another embodiment, the system may allow the user to select an ordinal location in the composite stream at which to place the response. In some cases, the first position is unavailable to the responder. For example, the stimulus is typically locked in to the first location. In other instances, a celebrity responder or another heavily weighted response will preclude the responder from inserting the response at that location.

If the user has selected a location for the response, the system associates the insertion location with the response at step 204 and proceeds to step 206. If the user has not indicated a location, the system proceeds to step 205 and applies a weighting algorithm to the response and uses the result to determine the location at which to insert the response.

In one embodiment, a new response is weighted highly and may be inserted at the earliest location in the string of responses that is available. In other instances, the new response is inserted next to a celebrity response in the composite video. When a response is inserted into a composite video, the system may re-weight (and correspondingly re-order) all previous responses. In another embodiment, the system simply moves all responses after the insertion point over one space, while keeping them in order.

In another embodiment, the system provides personal contextualized weighting. This means that the system will assign a higher weight to the responses of friends of a responder than for other responders. The system will group a responder's friends near the responder in the composite video, regardless of the source of the friend connection. For example, if the composite video includes a twitter friend, Facebook friend, or some other social media friend, the system will group all of those friends with the response of the responder. There may be no direct connection between the friends, but the connection with the responder is used to create the grouping.

After step 205 or 204, the system proceeds to step 206 and 206 the system builds the composite video, inserting the response at the determined location. At step 207 the system presents the composite video to the responder.

It should be noted that the system may maintain a plurality of versions of the composite video. In some cases, there is a plurality of versions of the composite video, each having all the responses that have been made to the stimulus, but each ordered in a unique manner based on the weighting given to the response at the time it was made or modified. This allows a large number of users to have their response positioned next to a celebrity response, or to be earlier in the composite stream. In this embodiment, the system can maintain an association for each responder to the raw data that comprises the composite stream, and assemble the composite appropriately whenever the responder invokes the stream. In other instances, the system includes a separate copy of a plurality of composite videos, each one having different responses based on who has responded to each particular incarnation. This reordering of the composite video may be accomplished at a central system location or may be performed on the mobile device itself as desired.

Figure 7:
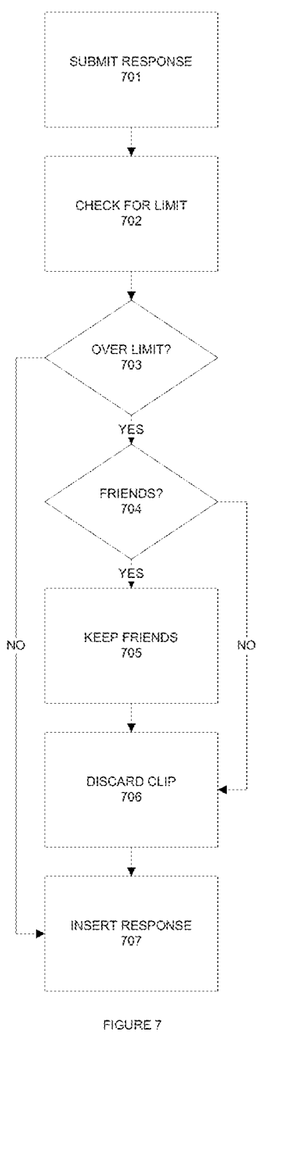
FIG. 7 is a flow diagram illustrating the operation of the system in an embodiment where there are a limited number of responses.

In the case where the system or the creator has limited the number of responses to a stimulus, the system will remove an existing response to add a new response, when the number of responses exceeds the limited number. FIG. 7 is a flow diagram illustrating the operation of the system in an embodiment where there are a limited number of responses. At step 701 the user submits a response to a stimulus. At step 702 the system checks for the limit on the number of responses. At decision block 703 the system determines if the number of responses (including the current proposed response) is over the limit. If not, the system proceeds to step 707 and inserts the response.

If the number of responses is over the limit at decision block 703, the system proceeds to decision block 704 to determine if any of the current clips in the composite video are friends of the present responder. If so, the system keeps those friends in the composite video at step 705 and proceeds to step 706 to remove a clip from the composite. If there are no friends at block 704, the system proceeds to step 706 to remove a clip. The rules of clip removal can be any appropriate, such as FIFO, lowest ranked, or the like.

At step 707 the system inserts the response into the composite video. This may be at the end of the string of clips, immediately after the stimulus, or based on any other ordering that may be appropriate. Typically, the stimulus will remain in the first position of a composite video.

Composite Video

Figure 3A:
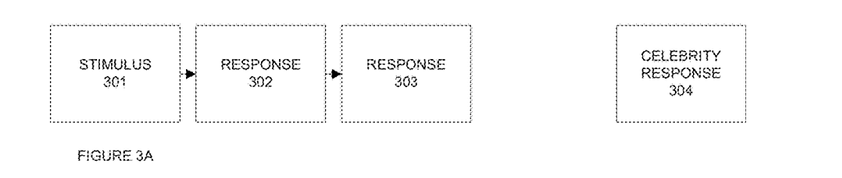
FIGS. 3A-3E illustrate an example of the operation of ordering a composite video in one embodiment of the system.

FIGS. 3A-3E illustrate an example of the operation of ordering a composite video in one embodiment of the system. In FIG. 3A, there is a stimulus 301 followed by two responses (302 and 303). This represents graphically a composite video made of clips comprising the stimulus 301 and response 302 and 303.

A celebrity finds the stimulus and decides to respond with response 304. The system is able to identify celebrity responders by their profile and associated metadata. In FIG. 3, because of the high weight given to celebrity responses, the celebrity response 304 is now inserted into the composite stream immediately after the stimulus, as shown in FIG. 3B.

Figure 3B:
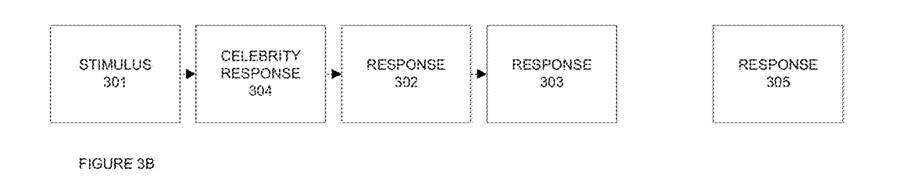
Figure 3C:
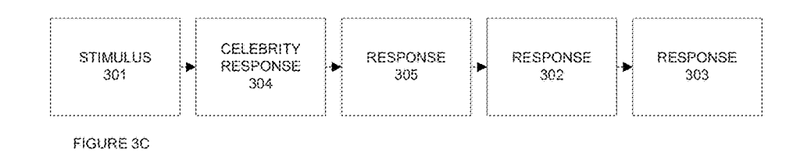
Figure 3D:
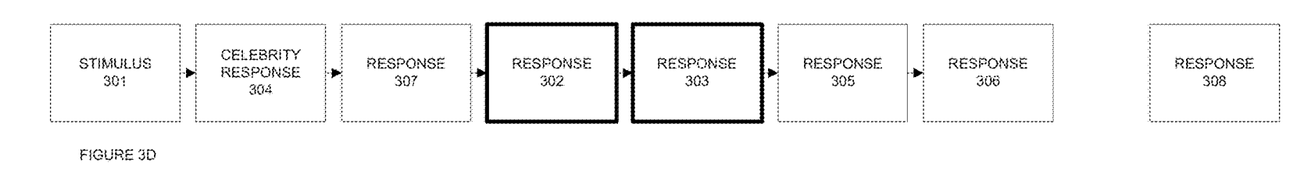

Now consider a new response 305 being made to the composite video of FIG. 3B. Because a new response is highly weighted in one embodiment of the system, the response 305 is inserted next to the celebrity response 304 as shown in FIG. 3C. Responses 302 and 303 are moved down in order accordingly.

Figure 3E:
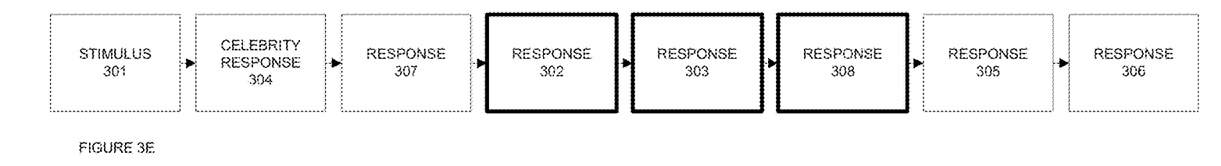

In some cases, the responses themselves can create their own thread within the stream of responses. Consider the example of FIG. 3D where responses 302 and 303 are shown in bold as being part of an independent thread via the bold borders. Non-thread responses 305 and 306 follow the thread. A new response 308 is responding to the thread comprised of responses 302 and 303. In this case the new response is inserted in the thread as shown in FIG. 3E. The new response 308 is now bolded to show that it is part of the thread and the response 308 is not inserted next to the celebrity response because of the clear choice made by the responder 308. The non-thread responses are simply moved down the line accordingly.

Weighting of a response to determine its position in a composite video may take one or more of several forms. For example, celebrities may be weighted heavily so that their responses will be early in a composite video, near the stimulus. In other cases, a user may "like" or rate a response. A response with a large number of likes or a high rating may receive heavier weighting than other threads. In one embodiment, a popular response may exceed the weighting of a celebrity and move to a preferred position in a composite video, e.g. near the stimulus. The weighting could also be based on the number of followers a particular user has acquired. The system contemplates the ability to follow another user as desired. Responders with a large number of followers will be more heavily weighted, regardless of any likes or ratings on a particular response.

Recording

Figure 4:
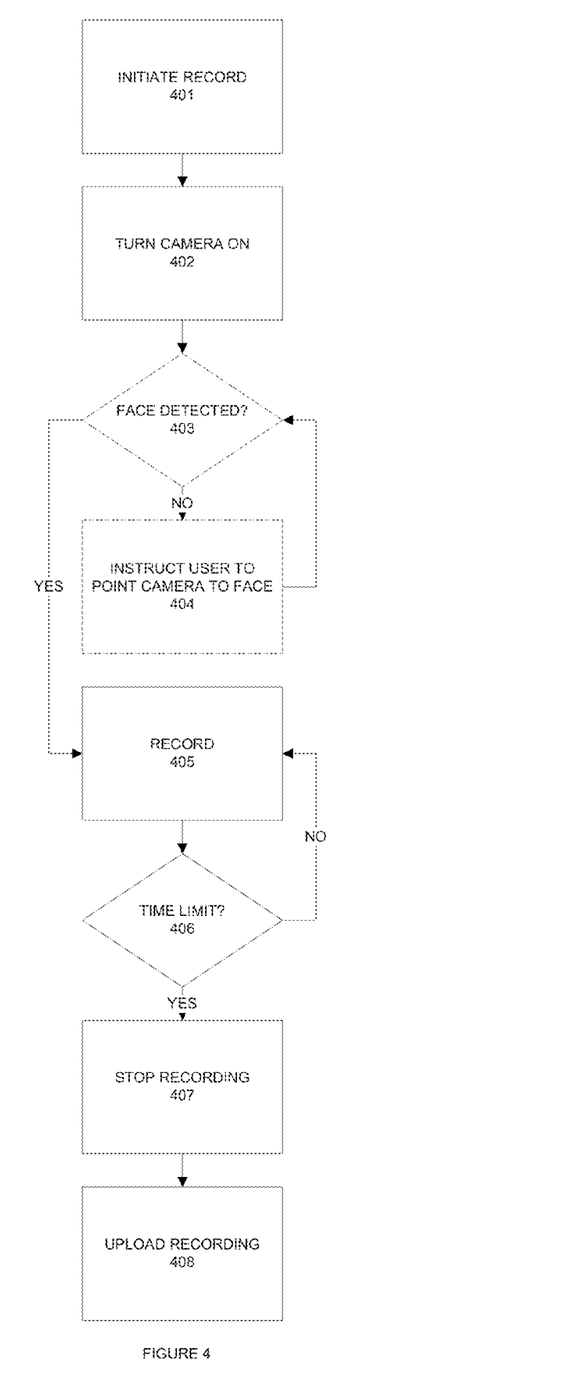
FIG. 4 is a flow diagram illustrating a response recording operation in an embodiment of the system.

FIG. 4 is a flow diagram illustrating the steps of recording a response in an embodiment of the system. This corresponds to step 202 of FIG. 2. At step 401 the user initiates the record process. At step 402 the system turns on the camera of the device on which the user is recording the response. At optional decision block 403 it is determined if the camera is detecting a face. In one embodiment, the system requires a response to be of the responders face. If a face is not detected at step 403, the system displays an instruction to the user to point the camera at a face at step 404 and returns to decision block 403.

If the system detects a face at step 403, the system begins recording at step 405. In one embodiment, there is a time limit for reach response (e.g. 4-5 seconds). At decision block 406 it is determined if the time limit has been reached. If not, the system returns to step 405 and continues recording.

If the time limit has been reached, the system stops recording at step 407 and uploads the response to the system at step 408.

Searching

The system contemplates a number of ways for a user to search for a stimulus and/or composite video. In one embodiment, the system allows a user to select a predefined category as shown in FIG. 6. The example categories may be hierarchical, with further subcategories below each top level category. They may be nested to two or more levels as desired. In one embodiment, when a category is selected, the user is presented with a still image of a composite video that includes the stimulus question for that composite video. In one embodiment, the system shows the composite videos for a particular category from most recent to oldest. The system may also order the videos in a category based on other factors, such as rating, number of likes, presence of friends of the user, or the like. Regardless of how the first composite video is selected, the user can swipe left or right on the image to move to other composite videos in that category. When the user desires to play an offered composite video, the user may simply tap on the image or activate an icon to begin playback. Once playback has started, the system continues playing all clips in the composite video until the user stops the playback or until all clips have been played.

In another embodiment, the system allows the user to search by user name, to find all composite videos containing at least one clip from a particular user. In another embodiment, the user name search can be limited to searching only stimuli created by a particular user. In another embodiment, the user can search by key word or hash tag, to find composite videos that are not associated with a category, or have included other descriptors in addition to a category designation.

In another embodiment, the system uses voice or speech recognition to identify key words and to identify a clip as positive or negative, providing additional meta data that can be used to characterize composite videos. In one embodiment, the speech recognition can be invoked to search certain composite videos of interest to the searcher. In other instances the system performs speech recognition in the background on all videos and generates an index of key words to correlate with each clip and/or composite video. In another embodiment, the system can use the speech recognition engine to determine if a response was positive or negative with respect to a stimulus, and thereby determine trends and reactions to a stimulus.

Operation of the System

Figure 8:
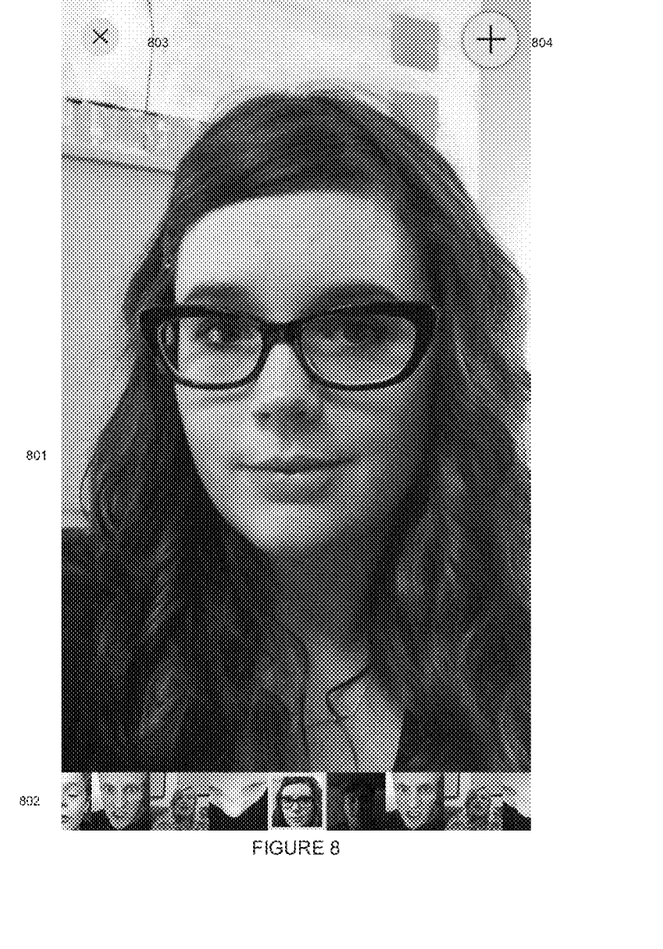
FIG. 8 is an example of a display configuration in an embodiment of the system.

In one embodiment, it is contemplated that the system will be implemented on smart-phones, tablets, mobile devices, and the like. One example of how a composite video might be presented in the system is shown in FIG. 8. The display includes a main region 801 for playback of the composite video. A region 802 below the main region 801 the system displays thumbnails of the response clips prior to and subsequent to the clip currently being played back. The user is free to tap on any of the thumbnails and the clip associated with that thumbnail will begin playback, skipping intervening clips. In addition, the user can swipe left or right on the region 802 to cause additional thumbnails to display and be selectable by the user.

When the user is done viewing a composite video, the user may select the X button 803. This will return the user to the user's home feed. If the user wishes to add a response to the stimulus, the user can select the + button 804 and the system will enter record mode as described in connection with FIG. 4. Depending on the rules associated with the composite video, the user's response will be attached to the end of the clips, at the location where the user desired to respond, or pursuant to some other rules associated with the composite video.

Figure 9:
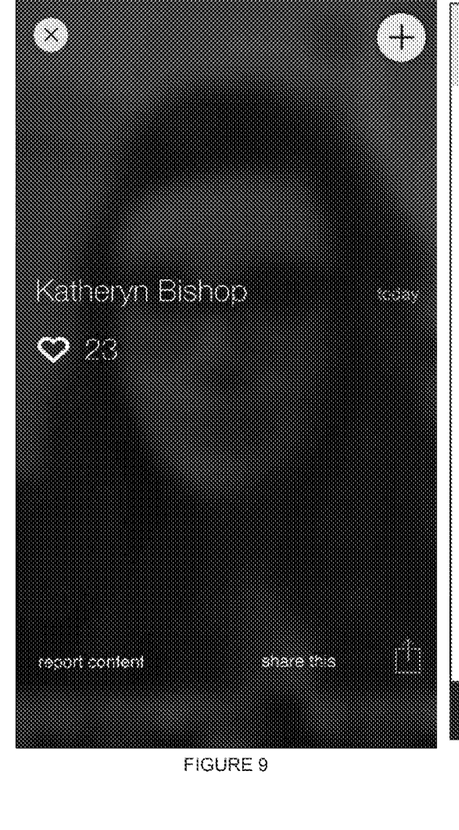
FIG. 9 is an example of a display configuration when playback is paused in an embodiment of the system.

If the user pauses the playback of the composite video (e.g. by tapping the display), the system will display information associated with the user of the current response. In the embodiment of FIG. 9, an overlay is added to the paused video image and information about the responder is provided, e.g. user name, date of response, number of likes, an ability to report the content if perceived in appropriate, and an ability to share the composite video by clicking on a share button.

Figure 10:
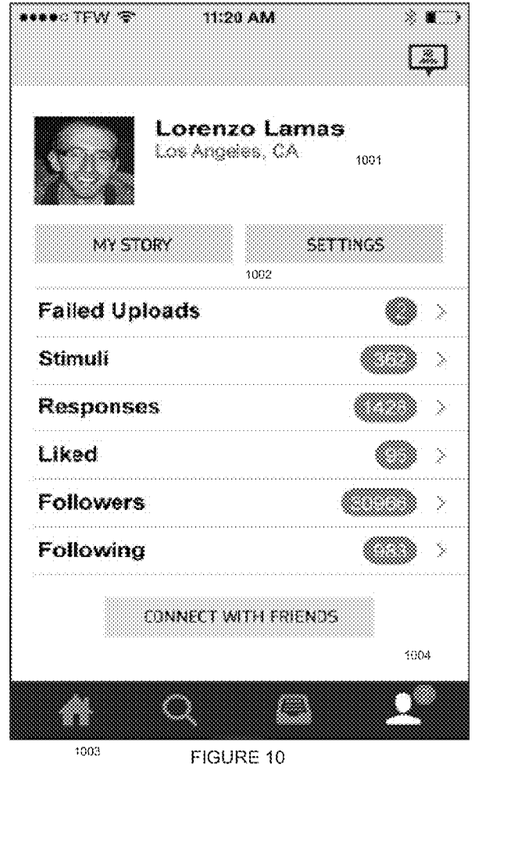
FIG. 10 is an example of a profile screen in an embodiment of the system.

FIG. 10 is an example of a profile screen in an embodiment of the system. The profile includes a region 1001 that includes the user name, a picture or avatar, and location information of the user. Region 1002 includes statistical information relevant to the user, including number of responses that the user has created, the number of stimuli the user has created, number of followers, number following, likes, and related information.

A region 1003 includes icons that can be invoked to initiate certain operations, including, but not limited to, home, search, feed, and alerts (indicated by a circle with a number inside, as shown by alert indicator 1004).

Presentation of Stimulus

In one embodiment, the system can be made part the comments section of any web site or presentation that includes a text based comment section. The system may replace or supplement the comment section. The author or publisher may "seed" the comment section for an article or other content with a stimulus. In other instances, the first commenter may select the stimulus that begins the system comment string. As responses are added, the composite video is updated appropriately and made available for viewing.

The system could also be used at review sites, such as Amazon, Fandango, or the like. A user can invoke the system at the review website and leave a review as a stimulus or as a response to a composite video and/or prior stimulus. In one embodiment, the site can invite the responder to begin every response with a phrase, such as "one star", "two stars", "three stars" and the like so that the system could use speech recognition to apply metadata to the responses and to allow sorting by level of review. This allows someone who may be only interested in the low reviews to have them automatically sorted out.

The system may be implemented as a widget that can be associated with a site, a page, or some other browser enabled location, so that it is easy for third parties to allow the creation of video strings associated with their sites.

The system contemplates the ability, through speech recognition or through manual review, to identify a response as positive or negative and to provide analytics and metrics based on those responses as well as the histogram of keywords mentioned above. For a commercial stimulus, the sponsor could learn which words show up the most in response. Those words could be specific features of a product (such as color, options, style, price, and the like) or could be frequently used descriptors. The sponsor could apply analytics to a string and take advantage of the word frequency to fine tune the product or advertising associated with the product.

The system allows users to limit access to a stimulus to one or more designated recipients (e.g. "friends"). This allows the system to work as a communication tool with back and forth conversation possible. This could replace email, texting, tweeting and other social media communication techniques.

In one embodiment, the system can display a map tied to the geo-location of a user. The map would indicate that composite videos are available for the physical locations on the map. For example, if you are at or near a restaurant, it would be possible to access a composite video of reviews of the restaurant. In another embodiment, composite videos have associated meta-data to make them searchable by subject matter, location, business, product, and the like. In this manner, a user can retrieve a composite video related to a subject of interest. The system can supplement or replace a review system such as Yelp.

In one embodiment, the system allows a user to create a personal composite video diary. Instead of creating a stimulus and receiving responses, the video diary is used to add clips of the user to existing clips of the user, allowing the user to comment on their own life or other areas of interest, and to share the video diary as desired.

Network Environment

Figure 12:
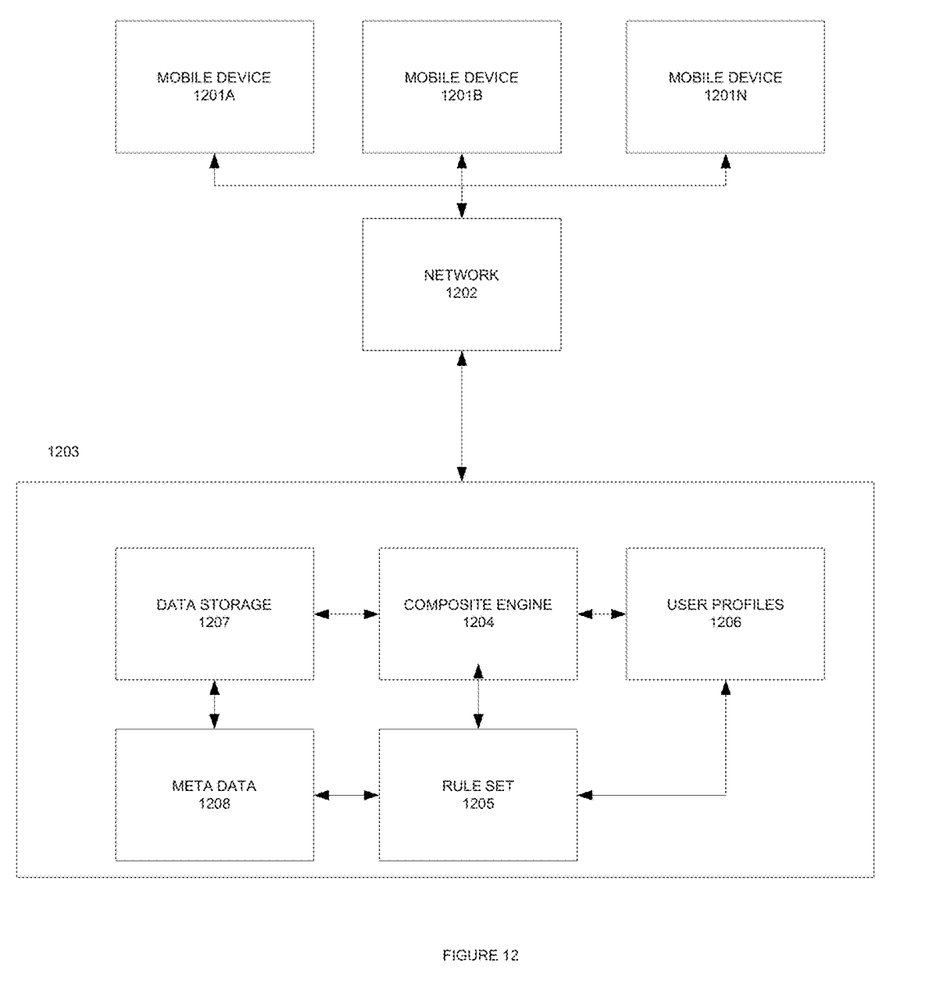
FIG. 12 is an example embodiment of an implementation of the system.

FIG. 12 is an example embodiment of an implementation of the system. In one embodiment, the system is implemented on mobile devices such as smartphones, tablet computers, touch pads, Google Glass, or any other suitable mobile computing environment. The system is not limited to these types of devices and they are described herein as examples only. Mobile devices 1201A, 1201B, through 1201N are coupled via network 1202 to composite video system 1203. The network 1202 may be, for example, the Internet and the connection may be wired or wireless.

The composite video system 1203 includes a number of components, devices, or modules that may be implemented in hardware, software, or some combination thereof. They may reside in the same location or be distributed and communicate via any network connection. In one embodiment, the system may reside in a cloud computing environment. The composite system 1203 includes data storage 1207 for storing stimuli and response video clips, User Profiles 1206 for storing information relating to each user (including followers, following, stimuli, responses, and the like), Meta Data 1208 for storing tags, categories, indexes, comments, speech recognition search results, and the like related to the composite videos and video clips, Rule Set 1205 for determining which rules to apply when assembling, updating, and/or transmitting a composite video, and Composite Engine 1204 for assembling composite videos pursuant to the descriptions herein.

In one embodiment, the mobile device itself may participate in the generation of the composite video. In this embodiment, the mobile device would determine at least part of a sorting order and/or inclusion decision and request the system to provide those parts of a composite video for assembling on the phone. In other instances, the raw video data is provided to the mobile device and the mobile device will sort and present the clips pursuant to a weighting approach that favors friends of the user. In this case, the mobile device may track friends of the user and weight any video clips that were created by those users with maximum weight so that they will appear earlier in the composite video.

Example Processing Environment

Figure 11:
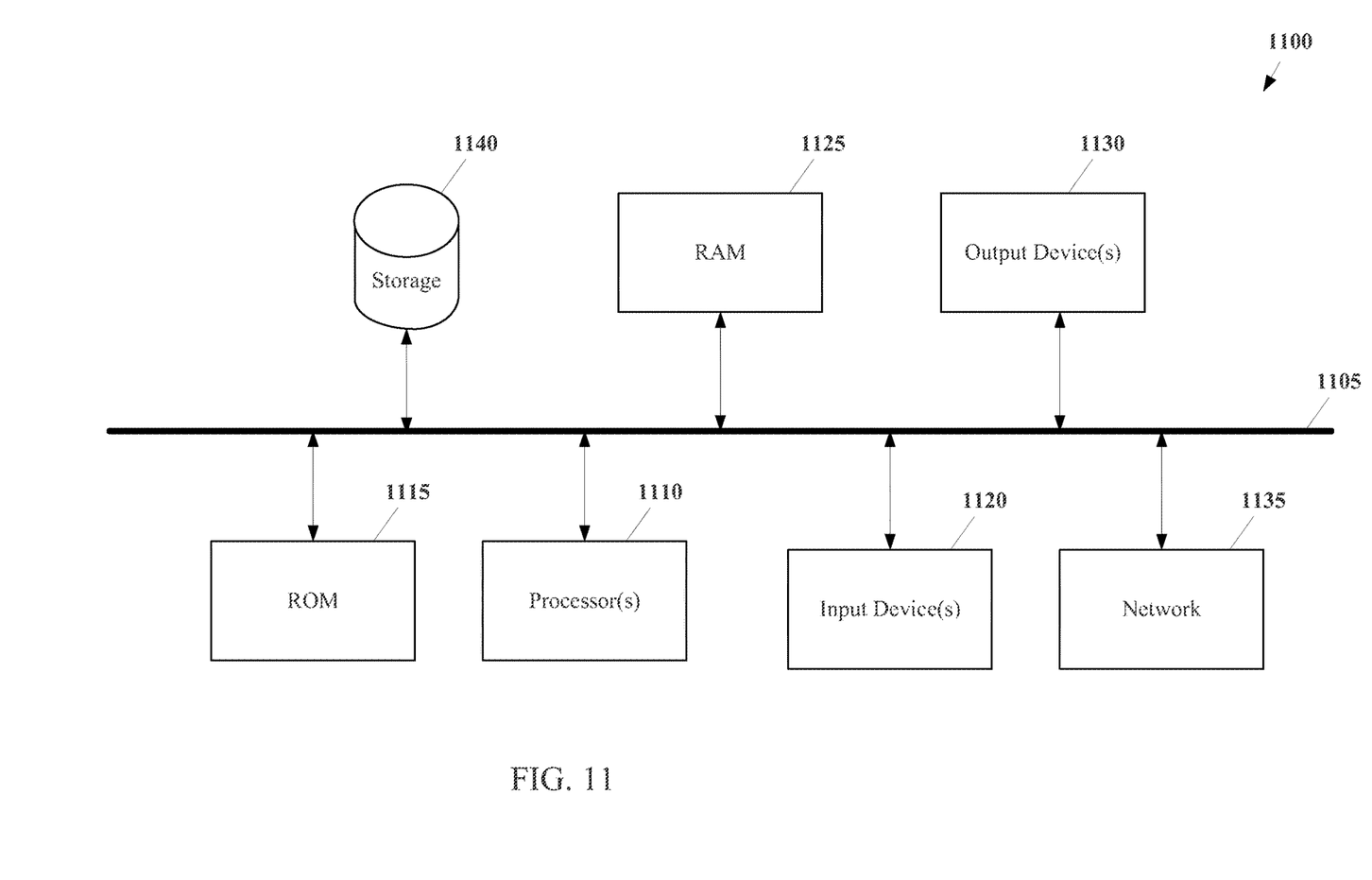
FIG. 11 is an example computer environment for implementing an embodiment of the system.

FIG. 11 illustrates an exemplary computer system 1100 that may implement the composite video system. The computer system includes various types of computer readable media and interfaces. The system includes a bus 1105, processors 1110, read only memory (ROM) 1115, input device(s) 1120, random access memory 1125), output device (s) 1130, a network component 1135, and a permanent storage device 1140. The system may be implemented in any suitable processing environment, including smart-phone, tablet computing device, laptop, desktop, and the like.

The bus 1105 the communicatively connects the internal devices and/or components of the computer system. For instance, the bus 1105 communicatively connects the processor(s) 1110 with the ROM 1115, the RAM 1125, and the permanent storage 1140. The processor(s) 1110 retrieve instructions from the memory units to execute processes of the invention.

The ROM 1115 stores static instructions needed by the processor(s) 1110 and other components of the computer system. The ROM may store the instructions necessary for the processor to execute the web server, web application, or other web services. The permanent storage 1140 is a non-volatile memory that stores instructions and data when the computer system 1100 is on or off. The permanent storage 1140 is a read/write memory device, such as a hard disk or a flash drive. Storage media may be any available media that can be accessed by a computer.

The RAM 125 is a volatile read/write memory. The RAM 1125 stores instructions needed by the processor(s) 110 at runtime. The bus 1105 also connects input and output devices 1120 and 1130. The input devices enable the user to communicate information and select commands to the computer system. The input devices 1120 may be a keyboard or a pointing device such as a mouse. The input devices 1120 may also be a touch screen display capable of receiving touch interactions. The output device(s) 1130 display images generated by the computer system. The output devices may include printers or display devices such as monitors.

The bus 1105 also couples the computer system to a network 1135. The computer system may be part of a local area network (LAN), a wide area network (WAN), the Internet, or an Intranet by using a network interface. The web service may be provided to the user through a web client, which receives information transmitted on the network 1135 by the computer system 100.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for" or, in the case of a method claim, the element is recited using the phrase "step for."

What is claimed is:

1. A method of automatically generating a composite video comprising:
    in a processing system:
    generating a first video clip comprising a call to action and associating a stimulus ID with the first video clip; wherein the associated stimulus ID identifies a type of creator;
    associating a set of rules with the first video clip based on the type of creator, wherein the set of rules define weighting factors to dynamically sort the composite video;
    generating a plurality of second video clips, each of the plurality of second video clips comprising a response to the call to action, each of the plurality of second video clips having the associated stimulus ID;
    combining a composite video comprising the first video clip and all second video clips having the associated stimulus ID pursuant to the set of rules;
    generating an image from a frame from the first and second video clip and displaying the image to the user.

2. The method of claim 1 wherein the first video clip is associated with a creator.

3. The method of claim 1 wherein a weight value is associated with popularity of a creator of a second video clip.

4. The method of claim 3 wherein the composite video is reordered when it is shared by users of the system.

* * * * *